Figure 1:
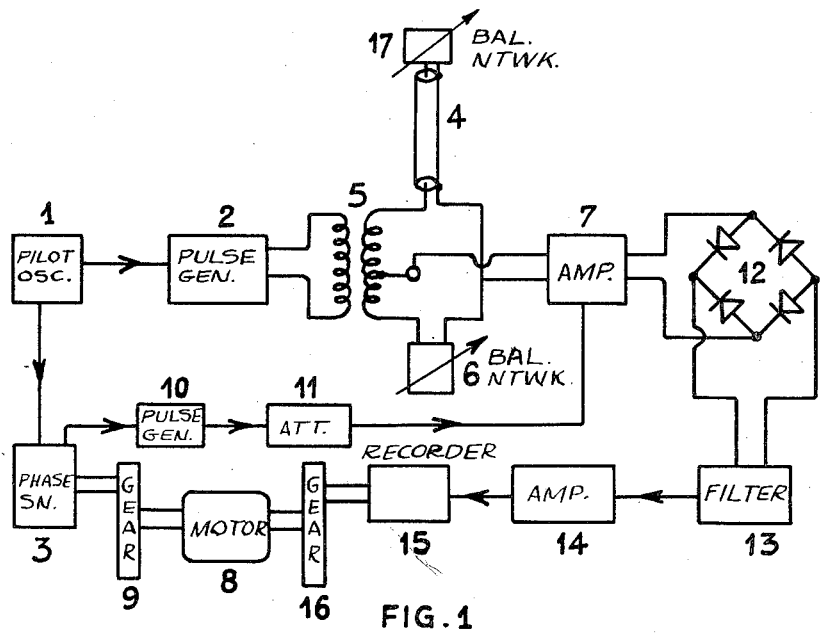

July 23, 1957 J. OUDIN ET AL 2,800,627
DEVICE FOR THE MEASUREMENT OF THE IRREGULARITIES
OF ELECTRICAL LINES
Filed May 4, 1954

INVENTORS:
JEAN OUDIN AND
GEORGES COMTE
BY:

United States Patent Office 2,800,627
Patented July 23, 1957

2,800,627

DEVICE FOR THE MEASUREMENT OF THE IRREGULARITIES OF ELECTRICAL LINES

Jean Oudin, Champagne-au-Mont d'Or, and Georges Comte, Lyon, France, assignors to Compagnie Generale d'Electricite, a French corporation Application May 4, 1954, Serial No. 427,471

Claims priority, application France May 18, 1953

3 Claims. (Cl. 324—52)

The use of pulse echometers for the detection of faults in very long electrical lines is restricted by the attenuation caused by such cables to the propagation of the echo signals. If, at the origin of the cable, pulses of excessively high power are emitted, there is a risk of damaging the cable; if, on the other hand, it is attempted to amplify greatly in order to raise the level of the echoes at the receiving end, it is found that these echoes are drowned in background noise due to the thermal agitation of the circuits; this background noise, of which the mean power is in proportion to the width ΔF of the pass-band brought into use by the pulses, is uncertain in nature; its fluctuations obey the laws of chance, it will never assume identical aspects at two different moments, however close they may be, while the pulses emitted by an echometer are periodic in character.

The object of the present invention is a device making it possible to accumulate the echoes of successive periods, for a fairly long time, without the effects of the background noise increasing equally quickly, which makes its possible to increase the length of the cable beyond which the echoes are no longer perceptible.

This device which comprises, in the well-known manner, a pilot oscillator synchronising a first generator supplying pulses, which are applied to a differential circuit, to which are connected, on the one hand, the cable to be tested, and on the other hand, a balancing device, and of which the outlet is connected, by means of an amplifier, to a rectifier bridge with quadratic characteristic, supplying a recording device by means of an integrating filter, is characterised in this that it comprises a rotary phase-shifter, driven by a variable-speed motor, and of which the input circuit is connected to the pilot oscillator, while its outlet is connected to a second generator supplying the pulses, of duration less than or at most equal to those supplied by the first generator, and which are applied, after amplification, to the input of the quadratic bridge, and that, moreover, the rotating portion of the recording apparatus is driven by means of a reducing gear, by the aforementioned motor.

The above mentioned recorder may be replaced by a cathode-ray oscillograph of which the sweeping voltage is synchronised to the operation of the variable phase-shifter, or, generally speaking, by any device permitting the observation as a function of time of the variations of an electrical magnitude.

The attached drawings represent, as a non-limitative example, an embodiment of a device according to the invention.

Figure 2:
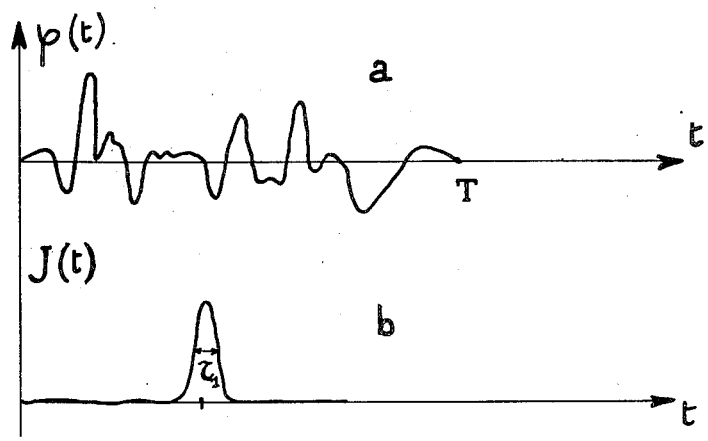

Fig. 1 is a diagram of the device and Fig. 2 is a diagram explaining its operation.

In Fig. 1, 1 is a pilot oscillator which generates a sinusoidal wave of period T; this wave is applied to a generator 2 supplying pulses of duration $\tau$, which are applied to the cable to be tested 4 by means of a bridge or differential transformer 5, to which is connected on the other hand a balancing network 6; the distant end of the cable is also connected to a balancing network 17. The echo voltages produced by the reflection of the pulses on the defects of the cable, and which return to the origin of the latter, are applied to the input of the amplifier 7.

The output of this amplifier is connected to a diagonal of a set of detector crystals having a parabolic current/voltage characteristic forming a bridge 12 of which the other diagonal feeds a recording device 15 by means of an integrating filter 13 and an amplifier 14.

Furthermore, the sinusoidal voltage coming from 1 is also applied to the input of a rotary phase-shifter 3. The latter may, for example, be composed of a phase-shifter with rotating field comprising two inductor windings set at 90° with respect to each other and fed by currents in quadrature, and a secondary coil rotating in the field of the two inductor windings; this phase shifter is moved by a motor 8 which makes it possible to cause it to undergo one complete rotation corresponding to a phase-shift of 360° in a time $\theta$ which can be made to vary between a few seconds and a few minutes, by employing if necessary a reducing gear 9.

The phase-shifter 3 can also be composed of a rotary phase-shifter with resistance-capacity, of which the rotary element is a resistance or a variable capacity; the driving device of this phase shifter may even be replaced by a variable control voltage in synchronism with the movement of the motor 8, if an electronically controlled phase shifter is used making use of vacuum tubes which act as variable elements.

The phase-shifted sinusoidal voltage coming from phase-shifter 3 synchronises a second generator 10 supplying pulses of duration $\tau_1$ less than or at most equal to $\tau$; these pulses are applied either to the input of the amplifier 7, after attenuation by a potentiometric device 11, or at an intermediate point of the amplifier 7. The pulses from the second generator 10 are applied to the amplifier 7 and accordingly are added to the echo voltages which are also applied to the amplifier 7.

Finally, the rotating part of the recording device 15 is driven by means of a reducing gear 16, by the motor 8.

The operation of the apparatus illustrated in Fig. 1 is as follows: the echo voltage reflected from the cable 4 can be represented as a time function $\varphi(t)$ having the same recurrence period T as the pulses from the main generator 2 and a more or less irregular wave shape, according to the impedance irregularities along the cable. The instantaneous value of $\varphi(t)$, shown graphically in Fig. 2, at any instant $t$ of the period T, consists of two parts, one of which is always the same, and is the proper echo voltage, the other of which is irregular, and is due to background noise. During the rotation of the electrical phase shifter 3 there are produced, in the pulse generator 10, recurring control signals having a period slightly different from T, in the shape of pulses of duration $\tau_1$ (illustrated on line 2 of Fig. 2), which are added in the bridge rectifier arrangement 12 to the voltage proportional to $\varphi(t)$ delivered by the amplifier 7.

Because of the parabolic characteristics of the rectifier, the instantaneous value of the voltage received at the output of 12 is substantially proportional to the square of the sum of $\varphi(t)$ and of the time function $J(t)$ representing the instantaneous amplitude of the control signals from 10. The voltage received at the output of the rectifier 12, according to the well-known rule of calculation of the square of the algebraic sum of two functions, is composed of three partial voltages, the first of which is proportional to the square of $\varphi(t)$, the second to the square of $J(t)$ and the third to twice the product $\varphi(t)J(t)$. The first two partial voltages are eliminated by the integrating filter 13, because of the high-frequency attenuation inherent in any time integrating device having a sufficiently large time constant. The third partial voltage is the only one that contains low-frequency components of period $\theta$, since forming the product $\varphi(t)J(t)$ is equivalent to sampling the curve $\varphi(t)$ at regular instants separated by time intervals slightly different from T, in such manner that the whole of the curve for $\varphi(t)$ is scanned during one revolution cycle $\theta$ of the phase-shifter 3. Consequently, the voltage received at the output of the filter 13 has the same wave-shape as $\varphi(t)$, but a much longer period, $\theta$, instead of T. The noise components are, of course, greatly reduced, since most of their energy lies in the high-frequency band, and as any low-frequency components that might be present only add according to the probability law, due to the irregular nature of noise. As the wave shape of the periodic pulses $J(t)$ is always the same from one pulse to the next, the product $\varphi(t)J(t)$ is equal to the instantaneous value of $\varphi(t)$ multiplied by a constant factor which depends only on the magnitude and the wave shape of each "sampling" pulse $J(t)$. If, as already mentioned, $\theta$ is taken much longer than T, a large number of pulses $J(t)$ occur in any small fraction of the period $\theta$, and voltages of value proportional to $\varphi(t)J(t)$ accumulate in the integrating filter 13. The noise occurring during the accumulation process, that is the integrating time, does not benefit by such integration since the noise occurs at random intervals due to its random nature. Accordingly, the time constant of the integrating filter 13 should not be too large if it is desired to preserve the final details of the curve $\varphi(t)$. In fact the time constant of the integrating filter 13 should be larger than T but much smaller than $\theta$.

Preferably, of course, there should exist some overlapping between the parts of the curve $\varphi(t)$ successively scanned under the action of two consecutive control pulses from 10. This means that $\tau_1$ should not be too small. However, no great inconvenience results if this condition is not fulfilled, as there is usually no sharp variation in the curve $\varphi(t)$ from one point to another located in its immediate vicinity.

Adjustment of the scanning duration may be effected by adjusting the speed of revolution of the rotary phase-shifter 3, which makes it possible to obtain on the recording device 15 a curve similar to the echo curve $\varphi(t)$, but described in a time $\theta$ much longer than T, so that the pass-band corresponding to this echo-curve is reduced in the ratio $$\frac{\theta}{T}$$

The power gain so obtained for the signal-to-noise ratio, makes it possible greatly to increase the maximum distance beyond which the echoes caused by the cable faults are no longer noticeable, which increases by that amount the range of the apparatus in relation to that of a pulse-echometer which is not provided with the improvement according to the invention.

What is claimed is:

1. Apparatus for testing a long electrical cable for irregularities comprising, in combination, a first impulse generator having an input and an output; a differential circuit having an input connected to the output of said first impulse generator and having first output terminals connected to said electrical cable under test and second output terminals, said impulses from said first impulse generator being applied through said first output terminals of said differential circuit to said electrical cable under test so that echo voltages are reflected from any irregularities in said cable under test back to said first output terminals of said differential circuit and from there to said second output terminals thereof; a variable electrical phase shifter having an input and an output; a master oscillator for providing a sinusoidal voltage and having an output connected to said inputs of said first impulse generator and said electrical phase shifter, respectively, to synchronize the impulses generated by said first impulse generator; a second impulse generator having an input connected to the output of said phase shifter so that its generated impulses are synchronized by said sinusoidal voltage shifted in phase by said electrical phase shifter, said second impulse generator having an output; an amplifier having an input connected to said second output terminals of said differential circuit and said output of second impulse generator for amplifying and adding together said echo voltages reflected from said cable and said impulses generated by said second impulse generator, said amplifier having an output; a rectifier circuit having an input connected to the output of said amplifier and having an output; an integrating filter having an input connected to said output of said rectifier circuit and integrating in time voltages appearing at the output of said rectifier circuit; recording means for recording any voltages transmitted through said filter; and means for synchronously driving said variable electrical phase shifter and said recording means.

2. Apparatus for testing a long electrical cable for irregularities comprising, in combination, a first impulse generator having an input and an output; a differential circuit having an input connected to the output of said first impulse generator and having first output terminals connected to said electrical cable under test and second output terminals, said impulses from said first impulse generator being applied through said first output terminals of said differential circuit to said electrical cable under test so that echo voltages are reflected from any irregularities in said cable under test back to said first output terminals of said differential circuit and from there to said second output terminals thereof; a variable electrical phase shifter having an input and an output; a master oscillator for providing a sinusoidal voltage and having an output connected to said inputs of said first impulse generator and said electrical phase shifter, respectively, to synchronize the impulses generated by said first impulse generator; a second impulse generator having an input connected to the output of said phase shifter so that its generated impulses are synchronized by said sinusoidal voltage shifted in phase by said electrical phase shifter, said second impulse generator having an output; an amplifier having an input connected to said second output terminals of said differential circuit and said output of said second impulse generator for amplifying and adding together said echo voltages reflected from said cable and said impulses generated by said second impulse generator, said amplifier having an output; a bridge rectifier having a voltage output substantially proportional to the square of its voltage input and having an input connected to the output of said amplifier; an integrating filter having an input connected to said voltage output of said bridge rectifier integrating in time voltages appearing at the output of said bridge rectifier; recording means for recording any voltages transmitted through said filter; and means for synchronously driving said variable electrical phase shifter and said recording means.

3. Apparatus for testing a long electrical cable for irregularities comprising, in combination, a first impulse generator having an input and an output; a differential circuit having an input connected to the output of said first impulse generator and having first output terminals connected to said electrical cable under test and second output terminals, said impulses from said first impulse generator being applied through said first output terminals of said differential circuit to said electrical cable under test so that echo voltages are reflected from any irregularities in said cable under test back to said first output terminals of said differential circuit and from there to said second output terminals thereof; a variable electrical phase shifter having an input an an output; a master oscillator for providing a sinusoidal voltage and having an output connected to said inputs of said first impulse generator and said electrical phase shifter, respectively, to synchronize the impulses generated by said first impulse generator; a second impulse generator having an input connected to the output of said phase shifter so that its generated impulses are synchronized by said sinusoidal voltage shifted in phase by said electrical phase shifter, said second impulse generator having an output; an amplifier having an input connected to said second output terminals of said differential circuit and said output of said second impulse generator for amplifying and adding together said echo voltages reflected from said cable and said impulses generated by said second impulse generator, said amplifier having an output; four rectifiers arranged in Wheatstone bridge connection having a parabolic current/voltage characteristic and having an input connected to the output of said amplifier and having an output; an integrating filter having an input connected to said output of said four rectifiers for integrating in time voltages appearing at the output of said four rectifiers; recording means for recording any voltages transmitted through said low pass filter; and means for synchronously driving said variable electrical phase shifter and said recording means.

References Cited in the file of this patent

UNITED STATES PATENTS

| | | |
|---|---|---|
| 2,477,023 | Weaver | July 26, 1949 |
| 2,499,000 | Quarles | Feb. 28, 1950 |